(12) United States Patent
Wyke et al.

(10) Patent No.: US 6,316,751 B1
(45) Date of Patent: Nov. 13, 2001

(54) APPARATUS FOR FORMING FIELD JOINTS ON PLASTIC COATED PIPE

(75) Inventors: Richard L. Wyke, Missouri City; Julio J. Fernandez, Houston, both of TX (US)

(73) Assignee: Fusion Weld Corporation, Stafford, TX (US)

( * ) Notice: Subject to any disclaimer, the term of this patent is extended or adjusted under 35 U.S.C. 154(b) by 0 days.

(21) Appl. No.: 09/498,436

(22) Filed: Feb. 4, 2000

Related U.S. Application Data (63) Continuation-in-part of application No. 09/089,997, filed on Jun. 3, 1998, now Pat. No. 6,059,319.
(60) Provisional application No. 60/082,486, filed on Apr. 21, 1998.

(51) Int. Cl.[7] .................................................. H05B 3/58
(52) U.S. Cl. .................. 219/535; 219/534; 219/528; 219/549; 285/41; 138/33
(58) Field of Search ................ 219/125.11, 534, 219/535, 537, 541, 633, 211, 212, 217, 528, 529, 549; 392/468, 469; 138/32, 33; 285/21.1, 21.2, 45, 55, 294.2, 294.4, 381.1, 41, 188, 259

(56) References Cited

U.S. PATENT DOCUMENTS

| | | | |
|---|---|---|---|
| 3,782,452 | * | 1/1974 | Ceplon .................................. 392/468 |
| 3,975,617 | * | 8/1976 | Othmer .................................. 392/469 |
| 4,199,009 | * | 4/1980 | Ballone .................................. 285/188 |
| 4,449,038 | * | 5/1984 | Reich et al. ........................... 219/535 |
| 4,493,985 | * | 1/1985 | Keller .................................... 219/535 |
| 4,629,216 | * | 12/1986 | Pedersen ............................... 285/21.2 |
| 4,675,512 | * | 6/1987 | Doucet et al. ........................ 219/535 |
| 4,880,962 | * | 11/1989 | Nolf et al. ............................. 219/549 |
| 4,990,380 | * | 2/1991 | Jensen et al. ......................... 219/535 |
| 5,137,591 | * | 8/1992 | Gansbuehler et al. ............... 219/535 |
| 5,169,176 | * | 12/1992 | Brossard ............................... 285/21.1 |
| 5,347,101 | * | 9/1994 | Brennan et al. ................. 219/125.11 |
| 5,560,847 | * | 10/1996 | Doucet .................................. 219/535 |
| 5,724,478 | * | 3/1998 | Thweatt ................................ 219/535 |
| 5,736,715 | * | 4/1998 | Keyes .................................... 219/535 |
| 5,883,363 | * | 3/1999 | Motoyoshi et al. .................. 219/535 |
| 5,916,468 | * | 6/1999 | Akiyama et al. ..................... 219/535 |
| 5,990,462 | * | 11/1999 | Scholl ................................... 219/535 |
| 6,158,784 | * | 12/2000 | Lavender ............................. 285/259 |

\* cited by examiner

*Primary Examiner*—Teresa Walberg
*Assistant Examiner*—Fadi H. Dahbour
(74) *Attorney, Agent, or Firm*—Conley, Rose & Tayon, P.C.

(57) ABSTRACT

A system and apparatus for and method of fusing a wrap to a portion of a length of plastic-coated pipe are disclosed. The system comprises a thermoplastic piece shaped to conform to the portion of pipe, the piece including a heat-generating trace and the heat-generating trace including a plurality of trace leads thereon. The system further comprises a clamp for applying pressure to the piece in the vicinity of the heat-generating trace, the clamp including at least two compression bands, each of the compression bands including a plurality of power leads, each of the power leads corresponding to one of the trace leads. The power leads preferably automatically are placed into electrical contact with said trace leads when the clamp is applied over the thermoplastic piece. The piece can be used for a variety of purposes, including bundling multiple pipes together, maintaining an annular space between concentric pipes, maintaining an anode in contact with two pipes and affixing a patch or cover to one or more pipes.

42 Claims, 6 Drawing Sheets

APPARATUS FOR FORMING FIELD JOINTS ON PLASTIC COATED PIPE

CROSS-REFERENCE TO RELATED APPLICATIONS

This Application is a continuation-in-part of co-pending U.S. application Ser. No. 09/089,997 filed Jun. 3, 1998 now U.S. Pat. No. 6,059,319, hereby incorporated herein by reference, which claims benefit of Provisional Appln. No. 60/082,486 filed Apr. 21, 1998.

STATEMENT REGARDING FEDERALLY SPONSORED RESEARCH OR DEVELOPMENT

Not Applicable.

FIELD OF THE INVENTION

The present invention relates generally to an apparatus for applying and/or repairing fusable wraps on plastic-coated pipelines. More specifically, the present invention relates to a unified device and system for thermally fusing a layer of plastic to the plastic pipe coating so as to perform a variety of functions, including: covering and cathodically and mechanically protecting the area of a weld joint of a pipeline in the field; covering and mechanically protecting an exposed end of pipe insulation; holding together pipes in a pipeline bundle; confining a sacrificial anode to the proximity of a pipeline; and supporting and spacing an inner pipe within an outer pipe. Further, the present invention relates to a device and system for protecting the area of a weld joint between insulated pipes in the field with at least one plastic or foam preformed piece, such as a half shell, and holding the half shell in place with a fusable wrap. Still more particularly, the present invention comprises a circumferential compression clamp provided with electrical leads arrayed circumferentially and a corresponding plastic wrap piece provided with correspondingly arrayed leads.

BACKGROUND OF THE INVENTION

Pipelines are commonly used to transport fluids both underground and subsea. It is typical for pipelines to be provided with some type of protective coating for anti-corrosion and/or mechanical purposes. Common types of coating include coal tar and asphalt enamel. A concrete coating or sheath can be applied to individual lengths of pipe in a coating yard, before the pipes are shipped to the location where the pipeline is to be assembled. Alternatively, in the case of underground pipelines, the coating can be applied to the pipe "over the ditch" after it is welded and immediately before it is placed in the ground. Yard-applied coatings are preferred in many instances because a superior coating job can be performed under the controlled conditions of a coating plant. Further, an outer coating, such as a concrete or plastic coating, can provide protection for insulation material that may be included between the pipe and the outer coating. Yard-applied coatings are also preferred when an inner pipe is used within a second, outer pipe. This allows the inner pipe to be coated when it is more accessible, before being placed within the second pipe. One example of the use of a pipe within a pipe is placement of a bore pipe at a road crossing.

Yard-applied coatings are also preferred when more than one pipeline is to be joined in a bundle. This allows each pipe to be coated before it is placed alongside another pipe. Pipeline bundles are useful in both underground and subsea applications, particularly for transporting separate fluid streams. For example, a pipeline bundle may be used to separate an export line from a production line so as to facilitate separate metering of the export and production fluids and accommodate different tax rates. Similarly, pipeline bundles may be used to separate a gas line from a liquid line, or a water line from a hydrocarbon line. Pipeline bundles may include pipelines of different diameters. For example, a smaller pipeline may be included with a larger pipeline in a "piggyback" arrangement. Pipeline bundles may be assembled from preformed pipelines. Alternatively, pipeline bundles may be formed simultaneously as the individual pipelines are formed from pipe segments. Assembly may occur in the yard or in the field, such as on a lay barge, and the pipeline bundle may be reeled for later use.

A variety of problems exist with the use of pipe having a yard-applied coating. These include problems related to the use of insulated pipe segments that have received a yard-applied coating, the use of pipelines having gaps in the yard-applied coating in the vicinity of weld joints between pipe segments, and the use of a combination of more than one pipeline having a yard-applied coating. Such combinations include the arrangement of a inner pipeline within an outer pipeline of larger diameter; as well as pipeline bundles, in which pipelines are arranged adjacently.

With regard to insulated pipe, a problem with yard-applied coatings is the need to cover an exposed end of insulation. A wrap sealing an exposed end of insulation is commonly called a "water stop". Insulation under a plastic coating typically does not extend beyond the coating into the gap region to either side of the weld joint, thus leaving a portion of the insulation exposed. Exposed insulation is vulnerable to water seepage, which is undesirable, as it contributes to deterioration of the thermal insulation. One technique for providing a water stop is to cover the exposed area of insulation as well as the area of coating and pipe to either side with a shrink sleeve. The shrink sleeve is formed of material that shrinks upon the application of heat, causing it to fit tightly over the region of exposed insulation. A disadvantage of this technique is its dependence on adhesive to bond the sleeve to the pipe, forming a seal. The adhesive is susceptible to deterioration, so that the bond may become unreliable.

With regard to pipe cathodically protected by a ribbon anode, a common problem with yard-applied coatings is the need to mechanically hold the anode to the pipe to prevent sagging of the anode away from the pipe when it is handled. To aid in the corrosion protection of metal pipe, particularly in subsea applications, a sacrificial anode is commonly anchored to the coated pipe and connected electrically to the pipe metal. An anode may take a variety of forms, a common form being that of a length of ribbon anode. More than one anode may be placed at intervals along the pipeline. In the case of pipeline bundles, one anode may be used to protect adjacent pipes. An anode is typically connected electrically to the pipe(s) at each end of the anode. A region of the plastic coating is removed to expose a portion of pipe, the anode is welded to the pipe in this region, and the weld area covered with epoxy for protection. Typically the weld is a thermite weld, such as is known under the tradename of CAD weld. An alternate weld is the pin weld, which penetrates further into the pipe. In either case, the welds at either end of the anode are insufficient to maintain the length of the anode close to the pipeline and prevent the anode from sagging away from the pipeline, for example when the pipeline flexes during handling.

With regard to the joint area of a pipeline, it is necessary to coat the uncoated portion of the pipe on either side of the weld joint once two lengths of coated pipe have been joined together. This portion is typically less than about three feet long. There are two known techniques for coating the weld joint area in the field. The first entails wrapping the weld joint area with a protective tape that overlaps the yard-applied coating at either end. The protective tape is not welded or fused to the yard-applied coating and therefore depends on adhesive to bond it to the yard-applied coating. One of the primary disadvantages of this technique is that it is not possible to achieve a hermetic seal of great integrity. If tape is utilized in the area of the weld joint, the seal in that area will not be of the same quality as the seal from the yard-applied coating on the remainder of the pipe, due in part to deterioration of exposed adhesive near the tape edges.

Another common technique for coating the area of the weld joint area of pipe in the field is to utilize a field mold that is fitted around the pipe. The mold forms an annular space around the weld joint, into which space is poured or injected a coating material that is compatible with the coating on the remainder of the pipe. While this process does result in the seal to the pipe surface in the area of the weld joint being of generally the same integrity as the coating on the remainder of the pipe, it lacks good adhesion to the plant-applied coating at the interface, as it may be difficult to achieve a good bond between the plant-applied coating and the field-applied coating. In addition, the process is relatively time consuming and therefore expensive.

In recent years, new types of pipe coatings have been developed utilizing extruded thermoplastic materials. Coatings of this type provide a hermetic seal of high integrity along the length of the pipe but are not well suited to the techniques described above for coating the weld joint areas of a pipeline in the field.

With regard to a pipeline within another pipeline, it is necessary to support a pipe placed within another pipe of a different diameter such that the inner pipe does not contact the outer pipe and is thus electrically isolated from the outer pipe. Without support for the inner pipe, gravity would cause the inner pipe to rest on the outer pipe, which is undesirable because it disrupts cathodic protection of each pipe by electrically shorting them out against each other. Such a support is commonly called a spacer or a casing insulator. Mechanical spacers may be placed in the annular space between the pipes to support the inner pipe. For example, when a bore pipe is used at a road crossing, one or more spacers are placed at a distance from each other longitudinally along the pipe. One technique that is known for separating the inner pipe from the outer pipe is the use of runners, made for example out of epoxy, which are arrayed circumferentially around the pipe and held to the pipe, for example with adhesive, clamps, or mechanical strapping. This technique has the disadvantage that the spacer(s), may slip along the inner pipe when the pipe combination is handled, causing the spacers to bunch or otherwise deviate from a beneficial placement.

With regard to a pipeline bundle, it is necessary when forming a pipe bundle to provide an apparatus for holding the pipes in the bundle together. There are two known techniques for joining pipes in a pipe bundle. In the first technique, pipe bundles are held together by wrapping a metal strap around the outer part of the bundle. The strap is affixed to itself to provide tension to join the pipes. However, this mechanical strapping has the disadvantage that it depends on the application of adhesive to prevent slippage of the strap along a plastic pipe coating. This requires an additional step and does not provide a strong durable bond between the strap and the pipe.

In the second technique for bundling pipes, a large plastic clamshell is closed over the pipes. The clamshell is banded on with mechanical straps such as steel bands. Alternatively, the clamshell is bolted together. One or more bolts may be placed through the halves, approximately tangentially to the pipe. In another arrangement, one or more bolts may be placed down the axis of the pipe, passed through openings in the adjacent halves of the clamshell. The clamshell bundle jacket has the disadvantage that it is only mechanically attached to the pipe bundle and does not provide a strong durable bond between the clamshell and the pipe. In addition, this technique has the disadvantages of added cost and mechanical bulk.

It is therefore desired to provide a unified and versatile method and apparatus for applying a wrap to a pipe coated with a similar or compatible thermoplastic corrosion protective coating material that is capable of bonding to the yard-applied material. It is further desired to provide a system and device that allows a wrap to be fused to a pipe so that each of the following may be accomplished. An area of a weld joint may be coated in a manner that provides a seal of the same quality and physical integrity as the coating on the remainder of the pipeline. Similarly, an area of insulated pipe end may be coated in a manner that provides a seal of the same quality and physical integrity as the coating on the remainder of the pipeline. Further, more than one thermoplastic-coated pipe may be bundled by a jacket which is affixed such that it does not slip along the bundle. Still further, a ribbon anode in a pipe bundle may be prevented from sagging away from the bundle. Finally, an inner pipe may easily, inexpensively and effectively be held in place within an outer pipe. It is further desired to provide a method and article for accomplishing each of these tasks that is easy to use and that is not highly dependent upon the skill of manual labor for uniformity of results.

SUMMARY OF THE INVENTION

The present invention features a unified and versatile system and device for quickly and easily sealing a wrap over a portion of a pipe coated with thermoplastic protective coating material in a variety of applications. The present system and device are easy to use and are not highly dependent upon the skill of manual labor for uniformity of results. Further, the present invention features a method for sealing a wrap over a portion of a pipe coated with thermoplastic protective coating material in a variety of applications.

In one aspect of the present invention, the weld joint area of a plastic-coated pipe is fitted with a joint-sealing piece of compatible plastic that is large enough to span the distance between the opposite ends of the pipe coating and overlap the ends slightly. A pipe joint sealed according to the present invention provides corrosion protection and a seal of the same quality and physical integrity as the coating on the remainder of the pipeline.

In an alternative aspect of the present invention, the weld joint area of a coated pipe is fitted with at least one plastic half shell that is large enough to span the distance between the opposite ends of the pipe coating, filling at least about half of the weld joint area. The half shell is strapped to the weld joint area with at least one piece of compatible plastic that wraps around the half shell and overlaps itself. A pipe joint filled according the present invention provides mechanical protection for the pipe joint area.

In another aspect of the present invention, a pipeline bundle including one or more plastic-coated pipes is fitted with a pipe-bundling jacket of compatible plastic that is large enough to encircle the bundle and hold the bundle together. A pipe bundle jacketed according to the present invention provides a system which is resistant to slippage of the jacket.

In yet another aspect of the present invention, two adjacent plastic-coated pipes in a pipeline bundle are fitted with an anode-confining patch of compatible plastic that is large enough to overlap each pipe at an interface and extend between the pipes over a valley between the two pipes. An anode, preferably a ribbon anode, is preferably located in the valley. A anode-confining patch according to the present invention prevents a ribbon anode from sagging away from the pipes in the vicinity of the patch.

In still another aspect of the present invention, the exposed area of the end of a section of insulation of a plastic-coated pipe, is covered with a piece of plastic compatible to the coating. Thus the insulation is covered and sealed against penetration of water, the piece forming a water stop.

Finally, in another aspect of the present invention, a plastic-coated pipe contained within a larger diameter pipe is covered by a spacer piece of compatible plastic which includes bosses which are of an appropriate size to support the inner plastic-coated pipe within the outer pipe.

The present invention comprises a wrap piece and a compression collar that can be slipped around the pipe so that it bears on the side edges of the wrap piece where they overlap the pipe coating layer. The compression collar also bears on the overlapped ends of the wrap piece. When the compression collar is latched, it applies a compressive force on each plastic interface that needs to be sealed.

The preferred wrap piece preferably includes a heat-generating trace that is configured to correspond to the regions of overlap at the sides and ends of the wrap piece. When supplied with power, the heat-generating trace melts the plastic at the two mating surfaces in the immediate vicinity of the trace, causing them to fuse. The compression collar of the present invention preferably includes a plurality of conductive leads that are electrically connected to a power supply lead and adapted to contact the heat-generating trace at a plurality of points. The points at which the heat-generating trace contacts the joint-sealing piece are preferably spaced apart so as to cause a relatively even heating of the heat generating trace. The compression collar may be formed in a shape and provided with power leads arrayed so that the collar corresponds with any one of the variations of the wrap piece described above.

According to another embodiment, the wrap piece includes a thermochromic component in the vicinity of the heat-generating trace. The thermochromic component preferably changes color at approximately the fusion temperature of the plastic that forms the pipe coating or the joint-sealing piece, so that completeness of fusion can be verified by visual inspection.

Thus, the present invention comprises a combination of features and advantages that enable it to overcome various problems of prior devices. The various characteristics described above, as sell as other features, will be readily apparent to those skilled in the art upon reading the following detailed description of the preferred embodiments of the invention, and by referring to the accompanying drawings. It is understood that, throughout this disclosure, like numerals appearing as reference labels in various of the drawings and at various locations in the text refer to like parts included in the preferred embodiment.

BRIEF DESCRIPTION OF THE DRAWINGS

For a more detailed description of the preferred embodiment of the present invention, reference will now be made to the accompanying drawings, wherein.

DETAILED DESCRIPTION OF THE PREFERRED EMBODIMENT

Pipe-bundling Jacket

Figure 1:
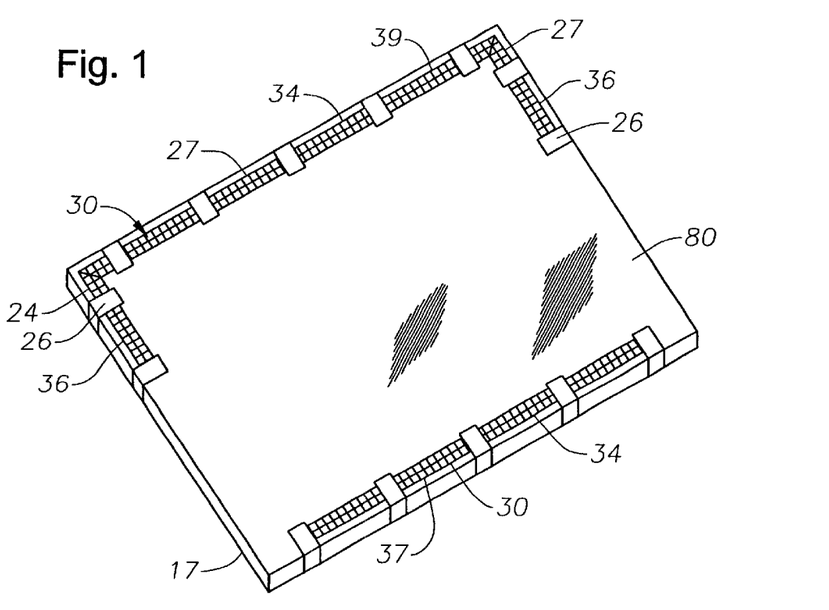
FIG. 1 is a perspective view of a pipe bundling piece.
Figure 2:
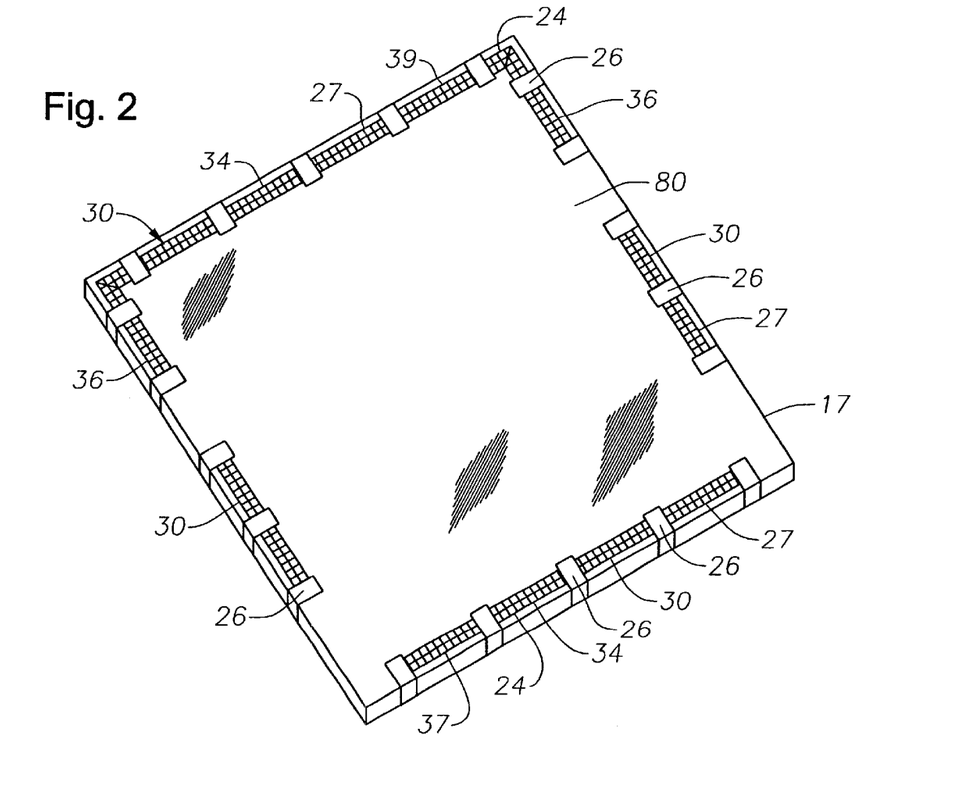
FIG. 2 is a perspective view of an alternative pipe bundling piece.
Figure 3:
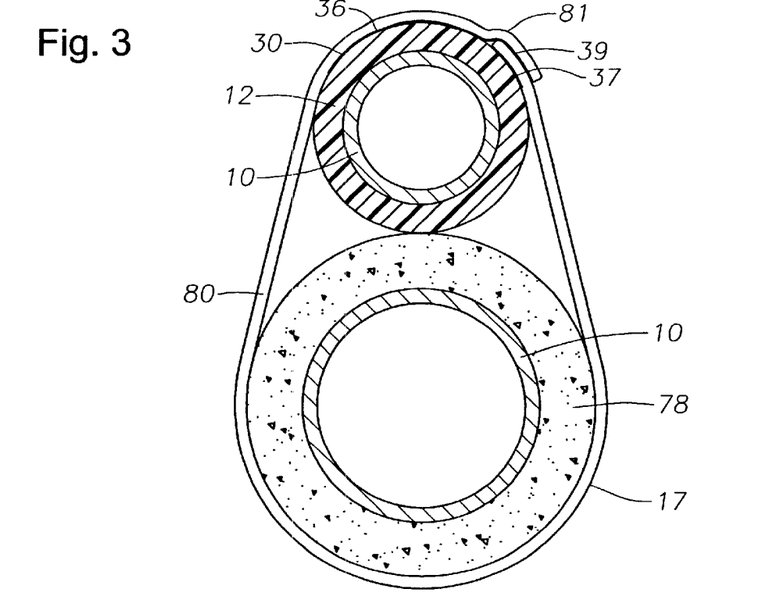
FIG. 3 is a cross-sectional view of a pipe bundling piece wrapped around a plastic-coated pipe and a concrete-coated pipe.
Figure 4:
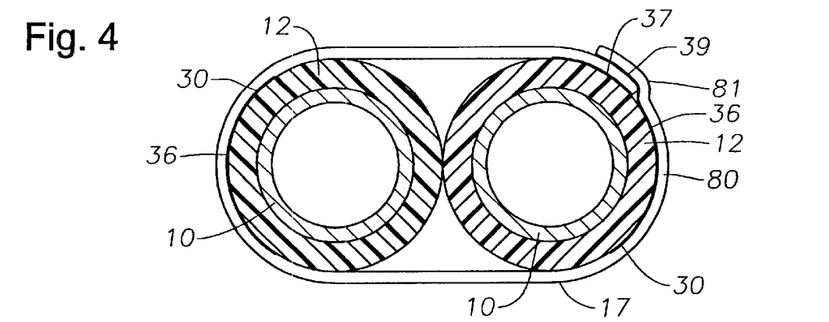
FIG. 4 is cross-sectional view of an alternative pipe bundling piece wrapped around two plastic-coated pipes.

Referring initially to FIGS. 1 and 2, one embodiment of a preferred wrap piece 17 is illustrated in two configurations suitable for use as a pipe bundling jacket 80. In FIGS. 3 and 4, the respective pipe-bundling jackets 80 illustrated in FIGS. 1 and 2 are each shown wrapped around a pipe bundle. Pipes are often bundled in groups of two or more pipes. Pipe bundles may optionally include support members (not shown) placed between adjacent pipes which may result in some clearance (not shown) existing between two pipes. Pipe bundles may comprises at least two similarly coated pipes, such as two pipes with plastic coating 12, as illustrated in FIG. 4. Alternatively, pipe bundles may comprises dissimilarly coated pipes, such as one pipe with concrete coating 78 and one pipe with plastic coating 12, as illustrated in FIG. 3. The diameter of individual pipes in a bundle may vary from about 4 to 36 inches or more. All pipes in a bundle may be of similar size, as illustrated in FIG. 4 or the bundle may include at least one pipe that differs in size from at least one other. The dimensions of the wrap piece necessary to wrap a given bundle varies with the number diameters of the pipes and the of pipelines in the bundle, which may be as many as 15 or more. Bundling jacket 80 is preferably about ⅛ inch thick. Preferably jackets are placed at intervals of 40 feet along the pipeline bundle.

Still referring to FIGS. 1–4, wrap piece 17 includes a heat-generating trace 30. Wrap piece 17 may include edges that overlap at overlap region 81 when piece 17 is placed over a pipe. It is preferable that piece 17 include a longitudinal trace 34. Wrap piece 17 may optionally also include circumferential traces 36. A single continuous heat-generating trace 30 may include both longitudinal and circumferential traces.

When wrap piece 17 is applied in the desired manner, each circumferential trace 36 is preferably sandwiched between coating 12 and piece 17. Similarly, at least one longitudinal trace 34 may include a coating interface conductor 37, sandwiched between coating 12 and piece 17. Further, when piece 17 is arranged such that its ends overlap, it is preferred that at least one longitudinal trace 34 include an overlap conductor 39, sandwiched between the two overlapping ends of piece 17.

When piece 17 includes both a longitudinal overlap conductor 39 and a longitudinal coating interface conductor 37, it is preferred that piece 17 is configured so that when the ends of piece 17 overlap, interface conductor 37 lies under overlap conductor 39 and in contact with the surface of one of the pipes. Further, it is desirable that trace leads 26 on coating interface conductor 37 be arrayed so as to contact corresponding leads 26 on overlap conductor 39, so that power can be distributed to coating interface conductor 37. This allows coating interface conductor 37 to receive power when it is located under two overlapping layers of piece 17. Heat resulting from electrical conduction through the overlap conductor 39 fuses wrap piece 17 to itself at overlap region 81. Electrical conduction through the coating interface conductor 37 fuses wrap piece 17 to a portion of plastic coating 12.

Joint-Sealing Piece

Figure 5:
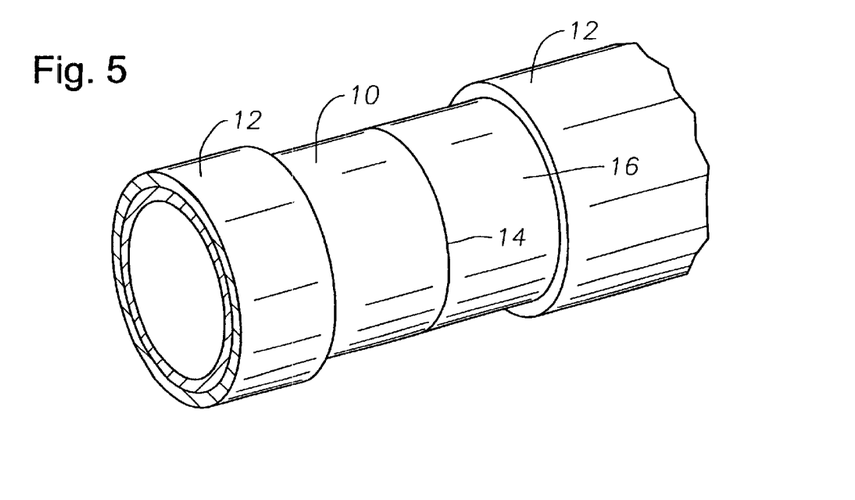
FIG. 5 is a perspective view illustrating a weld joint in a plastic-coated pipeline.
Figure 6A:
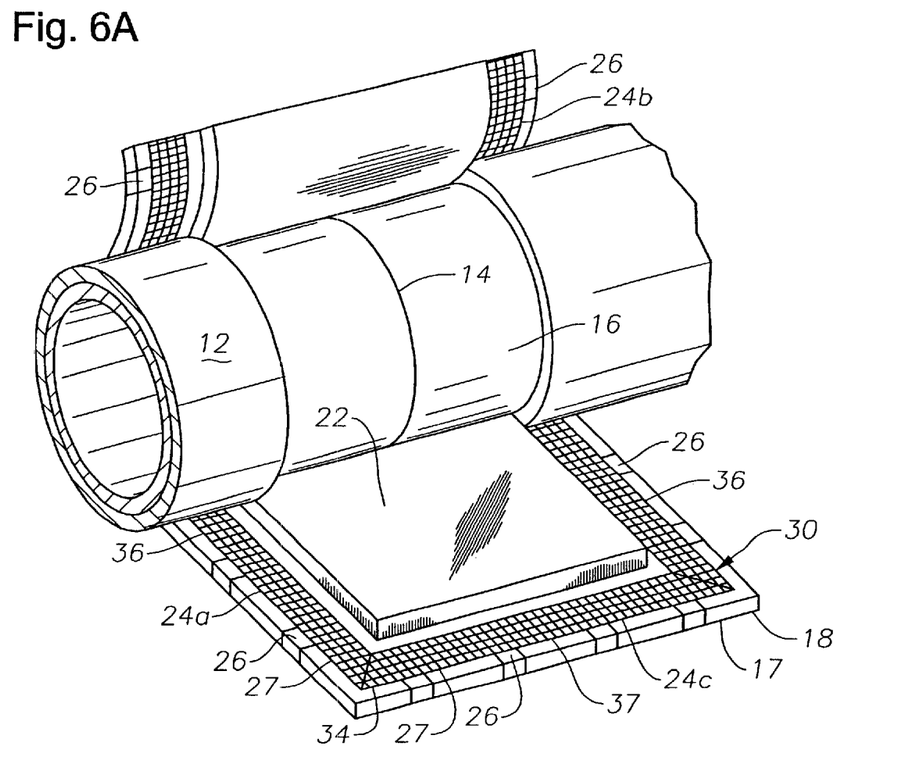
FIG. 6A is a perspective view illustrating the manner in which a joint-covering piece is wrapped around the weld joint.
Figure 6B:
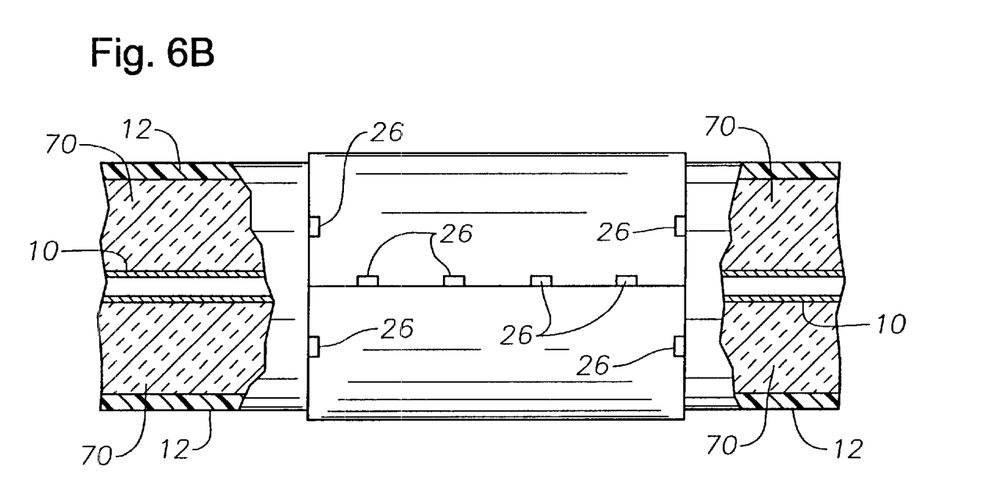
FIG. 6B is a cross-sectional view illustrating a joint-covering piece wrapped around the weld joint.

Referring now to FIGS. 5 and 6A–B, in another common field situation, two lengths of plastic coated pipe 10 are covered with a coating of thermoplastic material 12. The coating 12 terminates short of the end of each length of pipe. The ends of the pipes 10 are welded together to form a weld joint 14. An area 16 spanning from about 0.5 to about 1.5 feet on either side of weld joint 14 remains uncoated and therefore susceptible to corrosion. In a typical application, coating 12 is not less than about 25 mils in thickness and is preferably within the range of 40 to 75 mils thick. A layer of thermal insulation 70 may be included between coating 12 and pipe 10.

Referring particularly to FIGS. 6A–B, a preformed joint-sealing piece 18 is wrapped around area 16 overlapping the ends of coating layers 12. Joint-sealing piece 18 may include an under layer of 10 to 20 mils of butyl rubber. Joint-sealing piece 18 preferably comprises a layer of thermoplastic material that is cut to a width that is somewhat greater than the distance between the ends of the coating material 12 on pipe 10. Joint-sealing piece 18 is preferably at least about 25 mils thick and preferably in the range of 40 to 75 mils thick.

According to one embodiment, it is sometimes desirable to provide a corrosion preventive product as filler panel 22 on one face of joint-sealing piece 18. Panel 22 is preferably formed from butyl rubber, bitumastic, or rubberized bitumen and is of a width corresponding to the width of weld joint area 16. The thickness of panel 22 should be equal to the distance from the outside of the pipe to the outside of coating layer 12. Thus, if coating 12 comprises a thermoplastic resinous material with an adhesive undercoat, the thickness of panel 22 will equal the combined thickness of the adhesive plus layer 12. In most cases this will result in panel 22 having a thickness of no less than 35 mils and up to 100 mils. In other embodiments, filler panel 22 can be replaced with a wrapped layer of tape that serves the same purpose.

Referring particularly to FIG. 6A, a conductive heat-generating trace 30 is affixed to the edges of joint-sealing piece 18. Heat-generating trace 30 is preferably in the form of a strip or strips of wire mesh 24a–c. Conductors 24a and 24b extend along each side of piece 18, while conductor 24c extends across one end of piece 18. According to a preferred embodiment, conductors 24a–c are formed from a single length of mesh that is folded into 90° turns at the corners.

When piece 18 is placed around weld area 16 of pipe 10 as shown, adhesive panel 22 fills area 16 and the edges of piece 18 overlie the thermoplastic coating 12 on the pipe. Side conductors 24a and 24b are sandwiched between coating 12 and piece 18. At the same time, the third conductor 24c is sandwiched between the two overlapping ends of piece 18. Once the joint-covering piece is positioned in this manner, electrical power can be applied though leads 26.

In another preferred embodiment, panel 22 is omitted from the inner surface of piece 18 and the annulus between the inner surface of piece 18 and the pipe is filled instead in an alternative manner, or is left unfilled. Specifically, in one embodiment, the weld joint area is wrapped with a resilient material, such as mastic tape, prior to positioning of piece 18. In another embodiment, the annulus is left empty until after the ends and sides of piece 18 are fused and the annular space is thereby sealed. Once the seal is formed, a liquid sealant, such as a fast-setting polymer, can be injected into the annular space through a small hole. Alternatively, a fast-setting foaming polymeric composition can be used to fill the annulus, such as by molding in place, or pieces, such as foam or plastic, that are preformed to fill the annulus can be place around the weld joint area before the wrap is applied. If foam is used in the annulus, it may be desirable to adjust the density of the foam depending on the pressure environment in which the pipeline will be placed. Additional details regarding the embodiment of a joint-sealing piece are contained in U.S. patent application Ser. No. 09/089,997, issued as U.S. Pat. No. 6,059,319, hereby incorporated herein by reference.

Plastic Strap

In an alternative embodiment (not shown) the weld joint area of a coated pipe is fitted with a pair of plastic half shells that are large enough to span the distance between the opposite ends of the pipe coating, filling the weld joint area. At least one wrap piece 17 is wrapped around the pair of half shells. Preferably, a pair of wrap pieces 17 are each wrapped around the pair of half shells, with one wrap at either end of the half shells. The wrap piece comprises a piece of plastic compatible with the half shell plastic material. Each plastic strap includes a heat-generating trace 30 along its edges. Heat-generating trace 30 includes trace leads 26. When power is supplied through trace leads 26, the plastic strap is fused to the half shell. Thus each wrap 17 forms a plastic strap securing each half shell to the pipe joint, so that mechanical protection for the pipe joint area is provided. The pipe coating may be any conventional pipe coating, including a concrete coating. In this manner, mechanical protection is provided for a pipe joint between lengths of pipe coated with a material, such as concrete, which need not be suitable for fusion with a wrap piece 17.

It may be desirable when mechanical protection is needed only on the underside of the pipe joint, for example to protect the pipe joint and provide a smooth outer pipeline surface when the pipeline is passed over the stinger on a lay barge, to utilize one half shell covering one side of the pipe joint, thus saving the time and expense of installing a second half shell.

Water Stop

Figure 7:
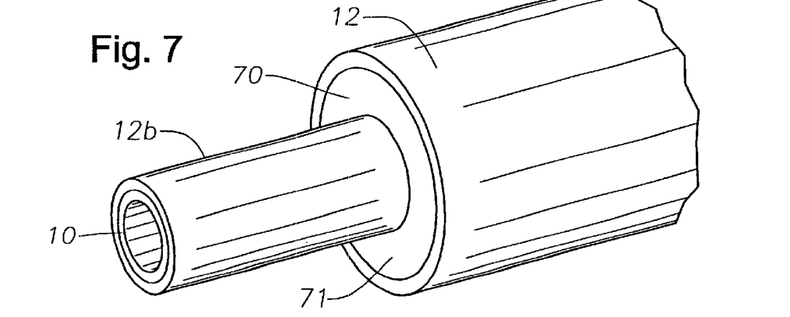
FIG. 7 is a perspective view illustrating an end of insulated plastic-coated pipe.
Figure 8:
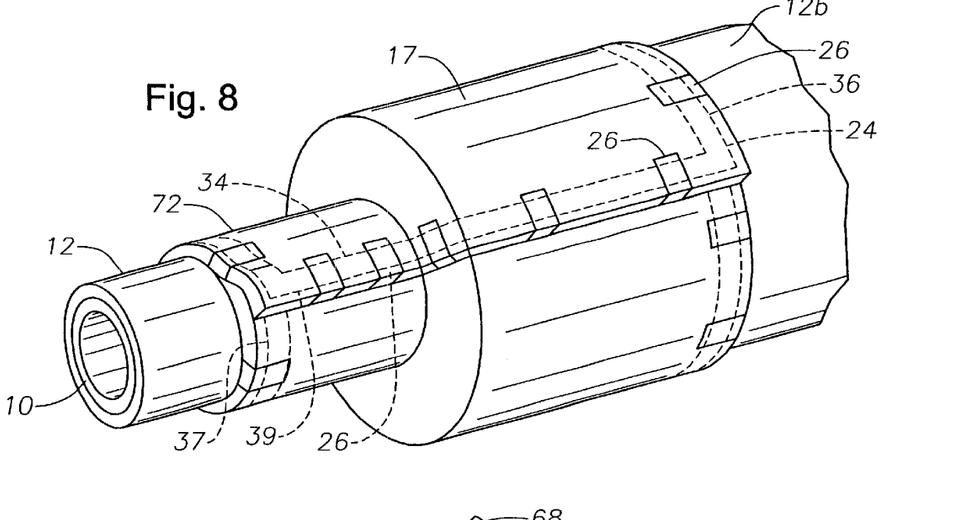
FIG. 8 is a perspective view illustrating a water stop piece wrapped around an insulated pipe end.

Referring now to FIGS. 7–8, in an alternative embodiment, a wrap is provided for the end of an insulated plastic-coated pipe. Insulation 70 is located between each of an inner plastic coating 12b and outer plastic coating 12, one over pipe 10 and under insulation 70 and one covering insulation 70 along the majority of the length of the pipe. Insulation 70 and plastic coatings 12 and 12b terminate a few inches short of the end of pipe 10, leaving the end portion 71 of insulation 70 exposed. Insulation 70 typically includes a foamed material, either open-cell or closed-cell foam, which is susceptible to ingress of water. Such passage of water is undesirable, as it contributes to deterioration of thermal insulation 70 of pipe 10. Referring to FIG. 8, a wrap piece 17 is wrapped around pipe 10, covering the exposed end portion 71 of insulation 70. Wrap piece 17 comprises a heat generating trace 30 (shown in phantom) and trace leads 26. When power is applied to through trace leads 26 heat is generated such that wrap piece 17 fuses to itself, forming water stop 72. An additional heat-generating trace 30 may be included on the underside of water stop 72 so that, when power is applied to an electrical circuit including the additional heat-generating trace, water stop 72 is fused to a portion of plastic coating 12. In order for there to be sufficient pressure introduced in the region of the heat-generating trace upon application of the compression collar to allow fusion of the water stop in the region of the wrap piece, it is preferred to include an expendable piece (not shown) under the longitudinal seam. The expendable piece may have any shape that provides a smooth transition between the diameters of the inner and outer plastic pipe coatings, including a smoothed step shape a frusto-conical shape. Further, wrap piece 17 may include at least two longitudinal traces along the same edge of piece 17 separated by a longitudinal trace gap, to accommodate a portion of the wrap piece 17 not overlying plastic. For example, the expendable piece may be non-plastic. Still further, although water stop 72 may in an alternative embodiment be preformed of a single wrap piece 17 that is continuous circumferentially, so that only one layer of wrap piece 17 overlies each covered portion of coatings 12 and 12b. In this embodiment, water stop 72 may be slipped over the end of the pipe.

Anode-confining Patch

Figure 9A:
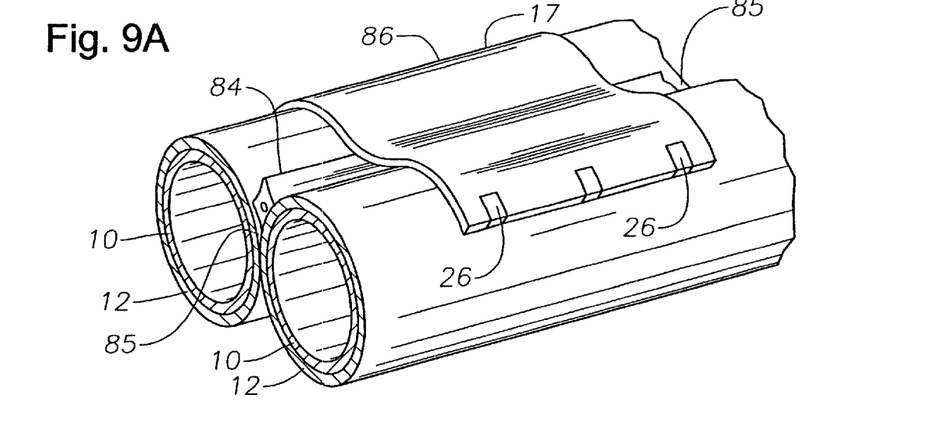
FIGS. 9A–B are perspective views illustrating the manner is which an anode-confining piece is attached to two plastic-coated pipes.
Figure 9B:
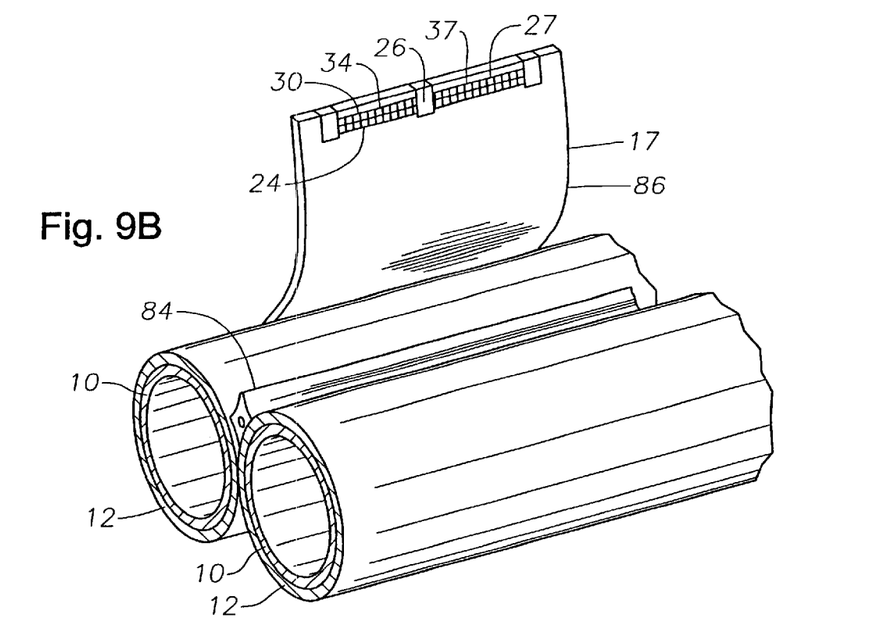

With reference to FIGS. 9A–B, in another alternative embodiment, wrap piece 17 forms an anode-confining patch 86, which is fused to each of two adjacent plastic-coated pipes in a pipe bundle. Ribbon anode 84 is located in the valley 85 between two adjacent pipes 10 coated with plastic coating 12. Ribbon anodes are typically about 200 feet long and preferably include a sacrificial zinc strip. The zinc, maintained in electrical contact with the metal pipe, is at an electrochemical potential relative to the metal of pipe 10 such that electrons are exchanged from the anode to the pipe, thereby inhibiting corrosion of the pipe. The ribbon anode preferably includes an anode protector covering the zinc strip. A patch 86 is preferably placed every 5 feet to hold the anode in place and prevent it from sagging in the region between pipe-bundling jackets, particularly when the pipe bundle is handled. Patch 86 is preferably about $\frac{1}{16}$ inch thick. Patch 86 may be rectangular, as illustrated in FIGS. 11A–B, or any other suitable shape that allows it to fuse to two neighboring pipes and maintain the ribbon anode within in the valley between the two pipes. Patch 86 contacts each pipe at an interface. Located in the vicinity of each interface is a heat-generating trace 30 including trace leads 26. Electrical conduction through this heat-generation trace fuses patch 86 to a portion of plastic coating 12 in the vicinity of the interface. Electrical conduction is generated as disclosed above, when electrical power is applied to electrical power leads 58 located on a compression collar 50 and maintained in contact with trace leads 26 on heat-generating trace 30. Anode-confining patch 86 is preferably about $\frac{1}{16}$ inch thick.

Pipe Spacer

Figure 10A:
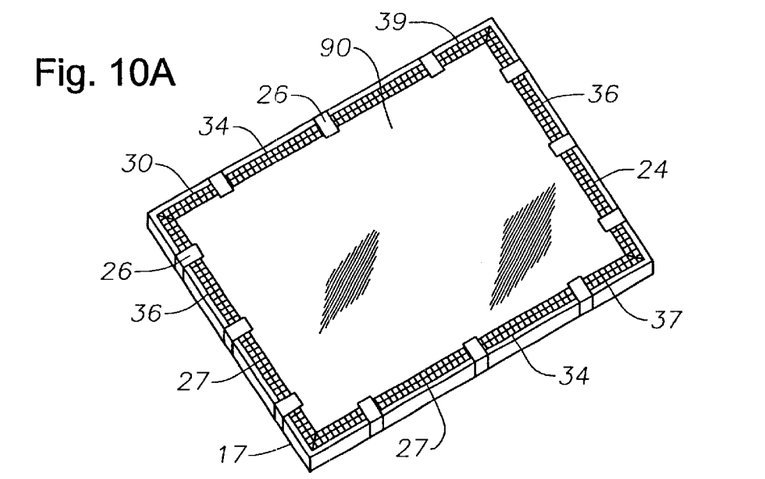
FIGS. 10A–B are perspective views of a spacer piece.
Figure 10B:
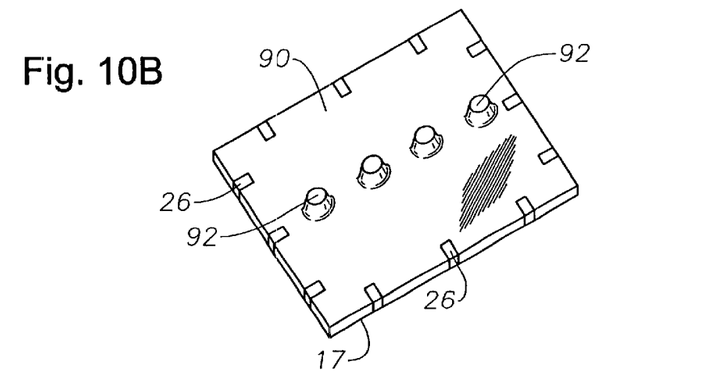
Figure 11:
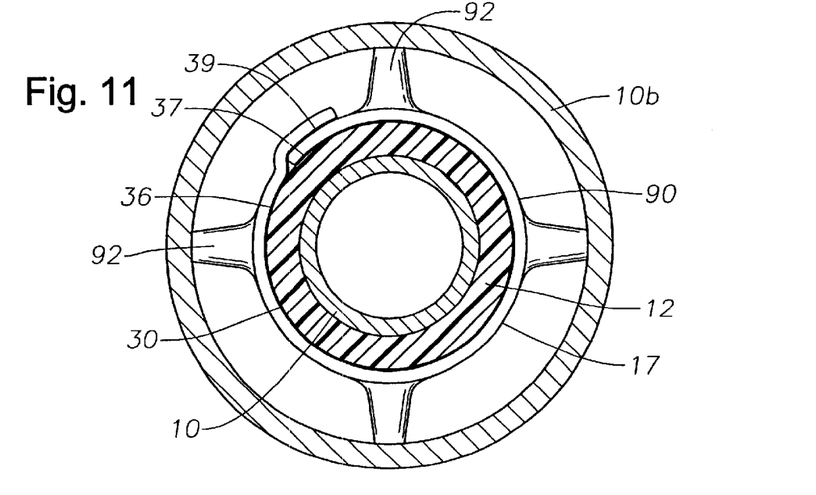
FIG. 11 is a cross-sectional view of a spacer piece wrapped around an inner plastic-coated pipe.

With reference to FIGS. 10A–B and 11, in yet another alternative embodiment, wrap piece 17 is shaped to include bosses 92. Bosses 92 may be formed by vacuum molding or by any other suitable method. Bosses 92 are arranged and sized so that when wrap piece 17 is wrapped around a pipe 10 that is coated with plastic 12, it forms a spacer 90 that maintains the position of pipe 10 when it is placed within a larger diameter pipe 10b. Located on spacer 90 is at least one heat-generating trace 30 placed so that spacer 90 can be fused to a portion of plastic coating 12. Each heat-generating trace 30 includes trace leads 26. Electrical conduction through the heat-generation trace fuses spacer 90 to a portion of plastic coating 12. Also located on spacer 90 is a second heat-generating trace 30. Electrical conduction through the second heat-generation trace fuses spacer 90 to itself. These two heat-generating traces are shown at opposite ends of wrap piece 17 in FIG. 10A, and correspondingly one above the other in FIG. 11, which shows spacer 90 in position. These placements are illustrative only. Other suitable variations that allow spacer 90 to be affixed to a portion of plastic coating 12 and which allow spacer 90 to maintain its place wrapped around the inner pipe 10 are within the scope of the preferred embodiment.

Referring now to FIGS. 1–4, 5, 8, 9A–B, 10A–B, and 11, fusable wrap piece 17 is preferably preformed according to the shape of a portion of at least one pipe segment. Fusable wrap piece 17 is formed of a suitable thermoplastic material such as polyethylene or polypropylene. The thermoplastic material of which wrap piece 17 is made is preferably the same as or compatible with the layer of thermoplastic material 12 and is capable of being bonded to material 12 by thermal fusion. A heat-generating trace 30 is affixed to at least one edge of wrap piece 17. Heat-generating trace 30 is preferably in the form of at least one strip of wire mesh 24. Each conductor 24 is affixed to one edge of wrap piece 17. Also according to a preferred embodiment, a plurality of conductive leads 26 are electrically connected to conductor 24. Each portion of each conductor 24 between adjacent leads 26 forms a resistance heating element 27. Conductors 24 affixed to adjacent edges of piece 17 are preferably formed from a single length of mesh that is folded at the juncture of the adjacent edges.

When piece 17 is placed around an area of pipe 10, piece 17 overlies a portion of the thermoplastic coating on the pipe. Once the wrap piece is positioned in place over pipe 10, electrical power can be applied through leads 26. For this reason, it is desirable to space leads 26 evenly around the circumference of the pipe and along the longitudinal axis of the pipe, so that the current flow in each resistance heating section 27 is the same. This results in uniform heating of the thermoplastic material in the vicinity of each heating section. It is also desirable to select the resistance value for each conductor 24 such that the heat output from each conductor will be approximately equal. Leads 26 are prefereably formed of a low resistance material such as copper or aluminum.

The conducting material used to form each conductor 24 is selected to have sufficient resistance when electrically energized to produce enough heat to melt the thermoplastic material(s) of which coating 12 and piece 17 are made. A preferred resistance wire comprises an alloy of sixty percent nickel, twenty-four percent iron, sixteen percent chromium and 0.1 percent carbon and sold under the trademark "NICHROME" by the Driver-Harris Co. The Nichrome wire is preferably formed into a relatively fine wire mesh.

There are particular advantages to using a heat-generating trace in the form of a mesh. The wire mesh heats evenly and tends to stay near the surface of the thermoplastic layer to which it is attached, even when stored for a long period of time. The mesh also offers a certain amount of structural strength to the fused interface and prevents the energized wire from cutting through the material of wrap piece or coating 12 during fusion. A particularly effective configuration for the mesh forming each trace is that of a flattened, woven tube, formed by a plurality of wires spiraling in opposite directions. Alternatively, the woven tube may be formed by a single knitted wire. Additional details regarding fusing of piece 17 in the aspect of the joint-covering piece 18 to the pipe coating are disclosed in U.S. Pat. Ser. No. 4,096,017, which is incorporated herein in its entirety.

Figure 12:
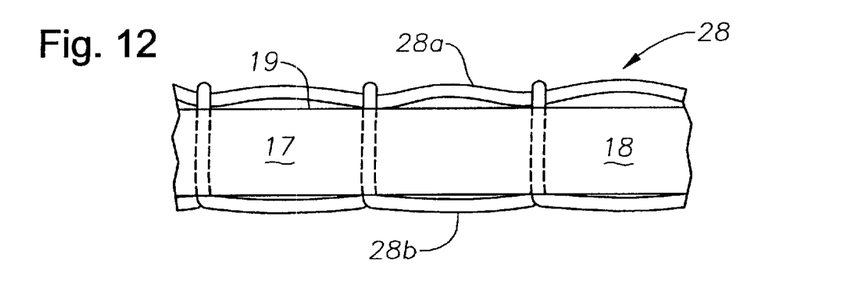
FIG. 12 is a perspective view of a compression collar in accordance with the present invention.

According to one preferred embodiment, the material forming heat generating trace 30 is stitched onto piece 17. Stitching provides a flexible, durable and uniform connection of the metal mesh conductors to the polymeric piece. A suitable thread for this stitching comprises non-conducting thread, such as nylon monofilament. Referring now to FIG. 12, in another embodiment, the mesh conductors are replaced with a two-thread stitching 28 in which one thread 28b is non-conducting and the other thread 28a is conducting. As will be understood by those skilled in the art, the conducting thread 28a lies along the inner face 19 of piece 17 and contacts coating 12. In this embodiment, stitching 28 itself forms the heat-generating trace 30 so that no additional conductor is needed.

In still another preferred embodiment, the material of piece 17 is made temperature-sensitive, so that the elevation of the temperature of piece 17 to a predetermined temperature is indicated by a visible change in color. The predetermined temperature is preferably approximately the fusion temperature for the polymeric materials.

Compression Collar

Figure 13:
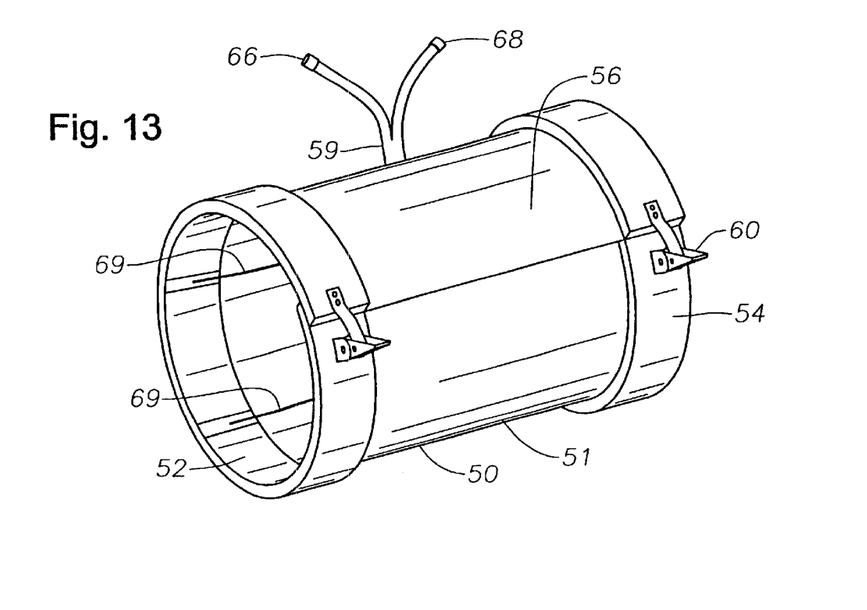
FIG. 13 is an enlarged view of an alternative embodiment of a heat generating trace on the present joint covering piece.

A preferred embodiment of the present system includes a compression collar adapted to perform the desired fusing step. In each case described above, this compression collar is adapted to conform to the item(s) in question. Referring now to FIG. 13, a compression collar 50 constructed according to the present invention is illustrated in the form of a joint compression collar 51 suitable for use with joint-sealing piece 18. Joint compression collar 51 has an approximately circular cross-section normal to the axial direction. Compression collar 50 comprises a pair of compression bands 52, 54 connected by a cross member 56. A plurality of power leads 58 are spaced about the compression bands 52. Additional leads 58 extend from cross member 56. Leads 58 are collected in parallel to a power supply (not shown) via a power cable 59. The number and positioning of power leads 58 preferably corresponds to the number and positioning of leads 26 on conductors 24, so that when collar 50 is positioned around the piece 17 in place around at least one pipe, power leads 58 align with and can be easily connected to leads 26. Preferably, the leads on piece 17 and compression collar 50 are configured such that the electrical connection therebetween is made automatically when collar 50 is clamped around the piece 17 in place around at least one pipe. This can be accomplished by bending each lead 26 back so that it lies on the outer surface of piece 17. For eample, this can be accomplished by using conductive tape to form the leads on piece 17. In particular, lead 26 may be formed of conductive aluminum foil. Preferably the foil is in the form of tape with an adhesive side. The adhesive side may be contacted with piece 17 to anchor the tape to piece 17. It is desirable to place adhesive foil under trace 30 in order to achieve electrical contact between lead 26 and trace 30. Further, a hole may be included in the foil to facilitate adhering trace 30 to piece 17. The portion of lead 26 on the outside of piece 17 may be larger in cross-section than the portion of lead 26 on the inside trace-bearing side of piece 17, and extend, for example, circumferentially or longitudinally. Power lead 58 is advantageously larger in cross-section than corresponding trace lead 26.

When collar 50 is clamped around the piece 17 in place around at least one pipe, electrical contacts 58 on its inner surface (shown in phantom) contact the leads without requiring any additional connecting steps. In another embodiment, leads 58 extend beyond the side edges of compression collar 50 and can be mechanically biased so that when collar 50 is clamped around the field joint leads 58 bear on leads 26 and maintain electrical contact therewith. These configurations for achieving automatic electrical contact are merely illustrative and the various methods for achieving this result can each be used alone or in combination with other methods. These devices eliminate the need for an additional connection step and thereby save time and money.

It is preferred that the wires connecting each lead to the power source be bundled and affixed to the device, so as to facilitate handling of the device and prevent objects from becoming entangled in the wires. The electrical connection between power leads 26 and the power source thus includes electrical bundle 59 extending from compression collar 50. Electrical bundle 59 includes insulated wires 69. At the end of bundle 59 opposite the power connection, a plurality of wires 69 divides off from bundle 59. Each power lead 58 is connected to a wire 69, thus receiving power when bundle 59 is connected to the power source. To facilitate reliable connection of compression collar 50 to an external power source, it is preferable that electrical bundle 59 divides into two sub-bundles of opposite polarity. Each sub-bundle terminates in a connector. Thus collar 50 includes two connectors, each of opposite polarity to the other, such as positive connector 66 and negative connector 68. Preferably connectors 66 and 68 are not interchangable, in order to prevent accidental misconnection of collar 50 to the power source. Connectors 66, 68 may be any suitable electrical connectors, such as electrical quick disconnect connectors, Lincoln connectors, Miller connectors, and the like.

There may be an even or odd number of power leads. It is preferred that they alternate polarity. In this preferred configuration, resistance heating sections 27 are also in parallel and current flows in opposite directions in adjacent resistance heating sections 27 when power is supplied to the leads. Also, the current flowing in each resistance heating section 27 will be one-half the current in leads 58, 26. It is further preferred that there be at least three leads at each circumferential interface and at least three leads along the longitudinal interface, so as to ensure even heating and thus better sealing results. As will be understood by those skilled in the art, the resistance of the various foregoing components and the voltage supplied across them can be varied so as to achieve the desired heating effect.

Compression bands 52, 54 each preferably fasten around the pipe with a quick-release type latch 60 that allows bands 52, 54 to be tensioned prior to latching. Tensioning of bands 52, 54 applies a radial compression force to the outside of the pipe. The inside surfaces of bands 52, 54 and cross member 56 are preferably provided with a resilient lining (not shown) that helps to evenly distribute the compression force over the interface area and reduces damage to the plastic piece 18. In a preferred embodiment, an additional circumferential strap (not shown) encircles the device between straps 52, 54 and applies a compressive force to cross member 56 when tightened. Preferably cross member 56 comprises a sleeve which extends between the compression bands 52, 54. Preferably, conductors 69 are affixed to the inner surface of the sleeve. Alternatively, cross member 56 may comprise a cross bar, which covers the area of a longitudinal trace when collar 50 is placed around piece 17.

It is preferred that the inner surface of collar 50 comprise a material to which the polymer of the pipe coating and the field joint will not adhere when melted. This will allow collar 50 to be easily removed from the field joint, even when the portion of the polymer that lies against the inner surface of the collar melts during fusion. Preferred materials having this characteristic include silicone and fluorine-containing synthetic resins. When wires 69 are internal to compression collar 50, wires 69 are preferably located under the material forming the inner surface of collar 50, so that wires 69 do not contact the portion of the polymer that melts during fusion.

For most typical thermoplastic coating materials, and a typical resistance wire, a current of between 30 and 200 amps will be required to achieve the necessary bonding in a reasonable amount of time. Generally, a current of between 30 and 200 amps for between thirty seconds and five minutes is adequate to achieve integral fusion of the two thermoplastic layers.

It is understood that for each application of piece 17 a corresponding compression collar is utilized. A corresponding compression collar for each of the alternative embodiments of wrap piece 17 discussed above would be obvious to one of ordinary skill in the art and is within the scope of the preferred embodiment. For example, it is sometimes desirable, for example for use with water stop 72, to provide compression collar 50 with a first section having a first diameter and a second section having a second diameter. The first and second sections are preferably adjacent opposite ends of a transition section included in compression collar 50. The transition section has a diameter increasing from one of the first and second sections to the other. The increase in diameter may be gradual, as for a conical transition section, or may be abrupt, as for a step shaped transition section which is approximately normal to each of the first and second sections. Likewise, suitable modifications to the shape of compression collar 50 and location of power leads 58 are envisioned such that compression collar 50 may be adapted to each contemplated variation of piece 17.

While preferred embodiments of this invention have been shown and described, modifications thereof can be made by one skilled in the art without departing from the spirit or teaching of this invention. The embodiments described herein are exemplary only and are not limiting. Many variations and modifications of the system and apparatus are possible and are within the scope of the invention. Accordingly, the scope of protection is not limited to the embodiments described herein, but is only limited by the claims which follow, the scope of which shall include all equivalents of the subject matter of the claims.

What is claimed is:

1. An apparatus for fusing a wrap around a portion of a coated pipe, the wrap contacting a fusable member at an interface and including a heat-generating trace in the vicinity of the interface and said heat-generating trace including a plurality of trace leads thereon, comprising:

a releasable clamp for applying a compression force to the interface; and     a plurality of electrical power leads supported on said clamp and positioned so as to correspond to the trace leads such that when said power leads contact the trace leads and power is supplied to said power leads, sufficient heat is generated in the trace to fuse the wrap to said fusable member at the interface.

2. The apparatus according to claim 1, wherein said pipe comprises a plastic coating and wherein said fusable member is said plastic coating.

3. The apparatus according to claim 1, wherein said clamp includes a pair of compression bands connected by a cross member.

4. The apparatus according to claim 3, wherein said cross member comprises a cross bar.

5. The apparatus according to claim 3, wherein said cross member comprises a sleeve.

6. The apparatus according to claim 5, wherein said sleeve has an inner surface and electrical power is supplied to said power leads through a plurality of conductors located on said inner surface.

7. The apparatus according to claim 6, wherein said clamp includes a conductor cable extending from said clamp for supplying power to said conductors.

8. The apparatus according to claim 7, wherein said conductor cable includes a pair of cable ends extending therefrom wherein each of said cable ends includes a connector wherein each connector is for accepting electricity of opposite polarity.

9. The apparatus according to claim 3, wherein each said compression band supports at least six power leads.

10. The apparatus according to claim 3, wherein each compression band supports an even number of power leads and adjacent power leads on each compression band are of opposite polarity.

11. The apparatus according to claim 3, further including at least a pair of leads for supplying power to a portion of the interface that is under said cross member.

12. The apparatus according to claim 1, wherein a portion of said wrap is fused to a second portion of said wrap.

13. The apparatus according to claim 1, wherein electrical connection between the trace leads and said power leads is effected by clamping said clamp so as to apply pressure at the interface.

14. The apparatus according to claim 1, wherein said clamp includes a tensioning latch.

15. The apparatus according to claim 1, wherein said clamp includes a resilient lining on its inner surface.

16. The apparatus according to claim 3, wherein each said compression band supports at least four power leads.

17. The apparatus according to claim 1, wherein said portion of pipe includes the region of a joint, wherein at least one preformed piece is adjacent said joint region, and located under at least a portion of said wrap.

18. The apparatus according to claim 17, wherein said preformed piece is plastic and wherein said fusable member is said preformed piece.

19. A system for covering a portion of plastic-coated pipe, comprising:

a thermoplastic piece including a first wrap portion shaped to conform to a portion of said pipe;

a heat-generating trace affixed to said piece, said trace including trace leads thereon; and     a clamp for applying pressure to said piece in the vicinity of said heat-generating trace;

wherein application of said thermoplastic piece to the pipe positions said trace and said leads for operation.

20. The system according to claim 19, wherein said piece further includes a second wrap portion shaped to conform to a portion of a companion pipe.

21. The system according to claim 20, wherein said companion pipe is a plastic-coated pipe.

22. The system according to claim 20, wherein said companion pipe is a concrete-coated pipe.

23. The system according to claim 20, wherein said companion pipe is located around said plastic-coated pipe, defining therebetween an annular space.

24. The system according to claim 23, wherein said piece further includes a plurality of bosses extending therefrom.

25. The system according to claim 19, wherein said wrap comprises a water stop.

26. The system according to claim 20, wherein said wrap comprises a joint-sealing piece.

27. The system according to claim 20, wherein said wrap comprises a spacer.

28. A system for covering a portion of plastic-coated pipe, comprising:
   a thermoplastic piece including a first wrap portion shaped to conform to a portion of said pipe;
   a heat-generating trace affixed to said piece, said trace including trace leads thereon;
   a clamp for applying pressure to said piece in the vicinity of said heat-generating trace
   wherein said piece further includes a second wrap portion shaped to conform to a portion of a companion pipe and wherein said wrap comprises a jacket for bundling a plurality of pipes.

29. A system for covering a portion of plastic-coated pipe, comprising:
   a thermoplastic piece including a first wrap portion shaped to conform to a portion of said pipe;
   a heat-generating trace affixed to said piece, said trace including trace leads thereon;
   a clamp for applying pressure to said piece in the vicinity of said heat-generating trace
   wherein said piece further includes a second wrap portion shaped to conform to a portion of a companion pipe and wherein said wrap comprises a patch for maintaining a ribbon anode in contact with the pipe.

30. A system for sealing an uncoated portion of a length of plastic-coated pipe, comprising:
   a thermoplastic piece shaped to conform to the uncoated portion and overlap the pipe coating at an interface surrounding the uncoated portion, said piece including a heat-generating trace affixed to said piece adjacent its edges, said heat-generating trace including a plurality of trace leads thereon; and
   a releasable clamp for applying a compression force to said interface, said clamp including a power source connectable to said trace.

31. The system according to claim 30 wherein said thermoplastic piece includes a first diameter portion and a second diameter portion.

32. The system according to claim 30 wherein said heat generating trace is affixed to said piece by means of stitching.

33. The system according to claim 30 wherein said heat generating trace comprises a line of conductive stitching on said piece.

34. The system according to claim 33 wherein said line of conductive stitching comprises one non-conductive thread and one conductive thread.

35. The system according to claim 30 wherein said piece comprises a piece of polymeric sheeting having a length greater than the circumference of the pipe, wherein said clamp is fastened by a latch, and wherein said clamp applies a radially compressive force to said interface when latched.

36. The system according to claim 30 wherein said piece includes a temperature sensitive compound that indicates when said piece has been heated to approximately its fusion temperature.

37. A system for protecting an uncoated portion of a length of coated pipe, comprising:
   at least one plastic half shell shaped to conform to the uncoated portion;
   a thermoplastic piece shaped to conform to said half shell, and overlie said half shell at an interface, said piece including a heat generating trace affixed thereto, said heat-generating trace including a plurality of trace leads thereon; and
   a clamp for applying a radial compressive force to said interface.

38. A system for holding together at least two plastic-coated pipes in a pipe bundle, comprising:
   a thermoplastic piece shaped to wrap around the bundle, overlying each of said pipes at an interface, said piece including a heat-generating trace affixed to said piece adjacent at least one edge, said heat-generating trace including a plurality of trace leads thereon; and
   a clamp for applying a compression force to said interface.

39. A system for confining a ribbon anode in galvanic contact with two plastic-coated pipes in a pipe bundle, comprising:
   a thermoplastic piece shaped to conform to the bundle and maintain the position of the anode, said piece including a heat-generating trace affixed to said piece adjacent at least one edge, said heat-generating trace including a plurality of trace leads thereon; and
   a clamp for applying a compression force to said interface.

40. A system for supporting a plastic-coated pipe within a second pipe, comprising:
   a thermoplastic piece having an inside and an outside and being shaped to conform to the outside of said plastic-coated pipe, said piece including a plurality of bosses protruding from the outer surface of said piece, said piece further including a heat-generating trace affixed to said piece, said heat-generating trace including a plurality of trace leads thereon; and
   a clamp for applying a compression force to said interface.

41. A method of protecting an uncoated portion of a plastic-coated pipe, comprising:
   shaping a thermoplastic piece to conform to said uncoated portion;
   contacting said piece with the plastic coating at an interface, wherein the piece includes a heat-generating trace in the vicinity of the interface and said heat-generating trace includes a plurality of trace leads thereon;
   latching a clamp over said piece, wherein the clamp applies a compressive force to said interface, and the clamp includes a plurality of electrical power leads positioned thereon so as to correspond to the trace leads; and
   supplying power to said power leads sufficient to generate heat in said trace, such that the piece is fused to the plastic coating at the interface.

42. A method of maintaining a bundle comprising a plastic coated pipe and at least one other pipe, the method comprising:

wrapping a thermoplastic piece around the bundle so as to contact said piece with the plastic coating at an interface, the piece including a heat-generating trace in the vicinity of the interface, the heat-generating trace including a plurality of trace leads thereon;

latching a clamp over said piece, wherein the clamp applies a compressive force to said interface, said clamp including a plurality of electrical power leads positioned thereon so as to correspond to the trace leads; and supplying power to said power leads sufficient to generate heat in said trace, such that the piece is fused to the plastic coating at the interface.

* * * * *